F. B. HENDRICK.
MILK BOTTLE HOLDER.
APPLICATION FILED APR. 13, 1914.
1,124,020.
Patented Jan. 5, 1915.
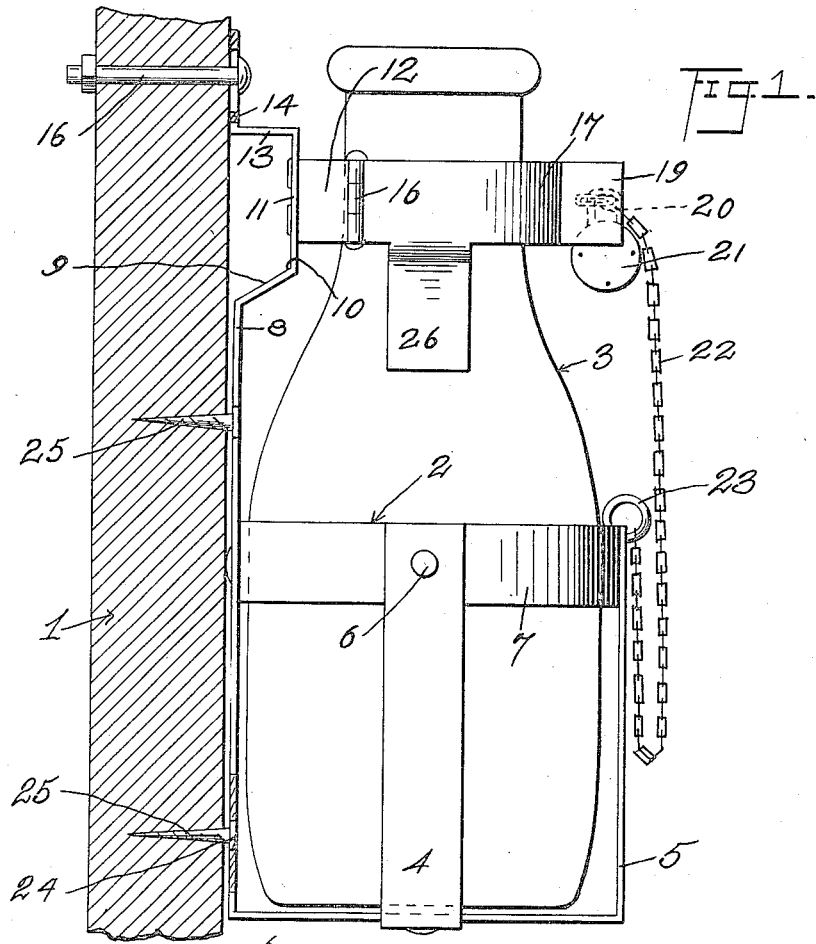
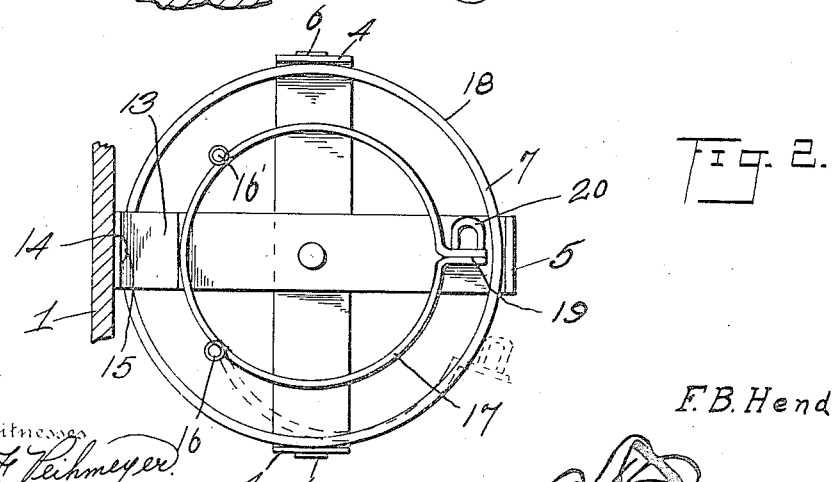
Inventor
F. B. Hendrick.
Witnesses
By
Attorney

UNITED STATES PATENT OFFICE.

FRANK B. HENDRICK, OF NEW YORK, N. Y.

MILK-BOTTLE HOLDER.

1,124,020.        Specification of Letters Patent.        Patented Jan. 5, 1915.

Application filed April 13, 1914. Serial No. 831,586.

*To all whom it may concern:*

Be it known that I, FRANK B. HENDRICK, a citizen of the United States, residing at New York city, in the county of New York and State of New York, have invented certain new and useful Improvements in Milk-Bottle Holders; and I do hereby declare the following to be a full, clear, and exact description of my invention, such as will enable others skilled in the art to which it appertains to make and use the same.

This invention relates to new and useful improvements in milk bottle holders, and has for its principal object to provide a device which is arranged to be secured to the side of a building to hold milk bottles and frustrate any attempt at stealing the device.

Another object of the invention is to provide a simple and efficient means for preventing milk bottles from being stolen and also for preventing any fraudulent practice by the drivers of milk wagons.

A further object of the invention is the provision of a simple and effective means by which the above mentioned objects may be accomplished in a simple and effective manner and to provide a device which may be produced at a minimum amount of cost.

With these and other objects in view the invention consists in the novel combination and arrangement of parts which will be fully set forth in the following specification and accompanying drawings, in which, Figure 1 is a side view in elevation of a device constructed in accordance with this invention showing parts thereof broken away to more clearly illustrate the construction thereof, and Fig. 2 is a top plan view of the device.

Referring now to the drawings by characters of reference, the numeral 1 designates as an entirety the side of a building or similar structure upon which the device, indicated generally by the numeral 2, is adapted to be secured. The usual milk bottle designated by the numeral 3, is shown in position and is arranged to seat within the cage formed by the device.

The cage 2 above referred to, preferably comprises the two strips of material 4 and 5, the upper ends of which are riveted or otherwise secured as at 6 to the ring 7, which ring is of greater diameter than the largest diameter of the milk bottle. An extension 8 is formed on one of the ends of the strip 5 and projects upwardly as clearly illustrated in Fig. 1. The free end of the extension 8 terminates in the angular projection 9 which is bent as 10 to form the vertical extension 11 to which the segment 12 is riveted or otherwise secured. A right angle extension 13 is formed at the free end of the portion 11 and terminates in the right angle extension 14 which is provided with a suitable aperture 15 through which a screw or bolt 16 is adapted to extend, and by means of which the device is secured in place. Hingedly secured as at 16' to the free terminals of the segmental member 12 are provided the segmental members 17 and 18 which terminate at their free extremities in the angular extension 19, one of which has rigidly secured thereto the staple 20 which is arranged to project through a slot formed in the coöperating extension. The padlock which is designated by the numeral 21, is arranged so that its shackle will extend through the staple 20 to firmly hold the device in its locked position. A suitable chain 22 is secured to the padlock and the free end of the chain is secured to the ring 23 which in turn passes through an aperture formed in the ring 7 to firmly hold the chain and prevent the lock from becoming lost. At suitable intervals in the strip 5 are provided the screw receiving apertures 24 through which the screws 25, which are arranged to hold the device to the side of a building, are adapted to pass.

Formed integral with each of the members 17 and 18 are provided the depending portions 26 which are arranged to frictionally engage the exterior of the milk bottle to prevent the same from being withdrawn from its position when the device is in place and locked.

It will be apparent from the foregoing that in use the cage 2 is secured to the side of the building by the screws 25 and when a bottle is placed in position within the cage by the driver, the segmental members 17 and 18 are swung on their hinges so that the coöperating extensions 19 come into engagement and the staple 20 projects through the slot in one of said coöperating members, thereupon the shackle of the padlock is passed through the staple and the padlock locked, thereby firmly locking the bottle in place and preventing the same from being removed until the padlock is unlocked by a person carrying the key.

While in the foregoing there has been shown and described the preferred embodiment of this invention, it is to be understood that such changes may be made in the combination and arrangement of parts as will fall within the spirit and scope of the invention as claimed.

Having thus described my invention, I claim:

1. In a device of the character described, a ring, strips secured to the ring, an extension on one of the strips and projecting upwardly, an off-set portion formed near the free end of the extension, a segmental member secured to the off set portion, a pair of segmental members being hingedly secured to the segmental member, extensions at the free ends of the segmental members, and a padlock adapted to engage the extensions to hold the segmental members in locked position.

2. In a device of the character described, a ring, strips secured to the ring at diametrically opposite points, an extension formed on one of the strips, an off-set portion formed near the free end of the extension, a segmental member secured to the off-set portion, segmental members hinged to the free ends of the first mentioned segmental member, angular projections formed integral with the second mentioned segmental members and adapted to project downwardly to frictionally engage the exterior of a milk bottle when the device is in use, angular extensions formed at the free ends of the segmental members, and a padlock adapted to engage the last mentioned angular extensions to hold the device in its locked position and prevent the milk bottle from being stolen.

In testimony whereof I affix my signature in presence of two witnesses.

FRANK B. HENDRICK.

Witnesses:
JOSEPH FINEMAN,
FRANCIS P. BOYLE.